US011410040B2

(12) United States Patent
Yoo et al.

(10) Patent No.: US 11,410,040 B2
(45) Date of Patent: Aug. 9, 2022

(54) EFFICIENT DROPOUT INFERENCE FOR BAYESIAN DEEP LEARNING

(71) Applicant: QUALCOMM Incorporated, San Diego, CA (US)

(72) Inventors: Seungwoo Yoo, Yongin-si (KR); Heesoo Myeong, Cheongju-si (KR); Hee-Seok Lee, Yongin-si (KR); Hyun-Mook Cho, Seoul (KR)

(73) Assignee: Qualcomm Incorporated, San Diego, CA (US)

( * ) Notice: Subject to any disclaimer, the term of this patent is extended or adjusted under 35 U.S.C. 154(b) by 842 days.

(21) Appl. No.: 16/168,015

(22) Filed: Oct. 23, 2018

(65) Prior Publication Data

US 2020/0125953 A1 Apr. 23, 2020

(51) Int. Cl.
*G06N 3/04* (2006.01)
*G06N 3/08* (2006.01)
*G06N 7/00* (2006.01)
*G06N 5/04* (2006.01)

(52) U.S. Cl.
CPC .............. *G06N 3/082* (2013.01); *G06N 3/04* (2013.01); *G06N 5/04* (2013.01); *G06N 7/005* (2013.01)

(58) Field of Classification Search
CPC .......... G06N 3/082; G06N 7/005; G06N 5/04; G06N 3/04; G06N 3/084; G06N 3/088; G06N 3/0472; G06N 3/0445; G06N 3/0454
USPC .......................................................... 706/15
See application file for complete search history.

(56) References Cited

U.S. PATENT DOCUMENTS

| | | | | |
|---|---|---|---|---|
| 2017/0286830 A1* | 10/2017 | El-Yaniv | .............. | G06N 3/0481 |
| 2019/0171927 A1* | 6/2019 | Diril | .......................... | G06N 3/04 |
| 2019/0212981 A1* | 7/2019 | Park | .......................... | G06N 3/04 |
| 2020/0074269 A1* | 3/2020 | Trygg | ...................... | G06N 7/00 |

OTHER PUBLICATIONS

Title: Dropout as a Bayesian Approximation: Representing Model Uncertainty in Deep Learning Authors: Yarin Gal , Zoubin Ghahramani Date: Oct. 4, 2016 Publisher: Proceedings of the 33rd International Conference on Machine Learning, New York, NY, USA, 2016. JMLR: (Year: 2016).*

(Continued)

*Primary Examiner* — David R Vincent
(74) *Attorney, Agent, or Firm* — Patterson & Sheridan, L.L.P.

(57) ABSTRACT

Certain aspects of the present disclosure are directed to methods and apparatus for deep learning in an artificial neural network. One example method generally includes receiving input data at an input to a layer of the neural network; replicating a group of neural processing units in the layer to form a superset of neural processing units, the superset comprising n instances of the group of neural processing units; processing the input data using the superset to generate output data for the layer; and determining an uncertainty of the output data. Processing the input data includes performing a dropout function by zeroing out one or more weights of a set of weights for each of the n instances of the superset of neural processing units and convolving, for each of the n instances in parallel, the input data with one or more non-zeroed out weights of the set of weights.

21 Claims, 9 Drawing Sheets

(56) References Cited

OTHER PUBLICATIONS

Title: Dropout: A Simple Way to Prevent Neural Networks from Overfitting Authors: Nitish Srivastava, Geoffrey Hinton, Alex Krizhevsky, Ilya Sutskeve rand Ruslan Salakhutdinov. Date: 2014 Publisher: Journal of Machine Learning Research 15 (2014) 1929-1958 (Year: 2014).*
Kendall A., et al., "What Uncertainties Do We Need in Bayesian Deep Learning for Computer Vision?," 31st Conference on Neural Information Processing Systems (NIPS 2017), Oct. 2017, pp. 1-12.
Wen W., et al., "Learning Structured Sparsity in Deep Neural Networks," 30th International Conference on Neural Information Processing Systems (NIPS 2016), Dec. 2016, pp. 1-10.

* cited by examiner

EFFICIENT DROPOUT INFERENCE FOR BAYESIAN DEEP LEARNING

FIELD OF THE DISCLOSURE

The present disclosure generally relates to neural networks and, more particularly, to an efficient dropout inference for Bayesian deep learning.

DESCRIPTION OF RELATED ART

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots.

Convolutional neural networks are a type of feed-forward artificial neural network. Convolutional neural networks may include collections of artificial neurons that each have a receptive field and that collectively tile an input space. Convolutional neural networks (CNNs) have numerous applications. In particular, CNNs have broadly been used in the area of pattern recognition and classification.

In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation. Advances in technology have resulted in smaller and more powerful computing devices. The prevalence of these computing devices is driven in part by the many functions that are now enabled on such devices. Demand for such functions increases processing capability requirements and, in some cases, generates a need for more powerful batteries. Within the limited space of the housing of these computing devices, batteries compete with the processing circuitry. These and other factors contribute to a continued miniaturization of components within the circuitry.

BRIEF SUMMARY

Certain aspects of the present disclosure are directed to a method for deep learning in an artificial neural network comprising a plurality of neural processing units. The method generally includes receiving input data at an input to a layer of the neural network, replicating a group of neural processing units in the layer of the neural network to form a superset of neural processing units, wherein the superset of neural processing units comprises n instances of the group of neural processing units, processing the input data using the superset of neural processing units to generate output data for the layer of the neural network, wherein processing the input data comprises, performing a dropout function by zeroing out one or more weights of a set of weights for each of the n instances of the superset of neural processing units, and convolving, for each of the n instances of the superset of neural processing units in parallel, the input data with one or more non-zeroed out weights of the set of weights, and determining an uncertainty of the output data for the layer of the neural network.

Certain aspects of the present disclosure are directed to an apparatus for deep learning in an artificial neural network comprising a plurality of neural processing units. The apparatus generally includes at least one processor configured to receive input data at an input to a layer of the neural network. The at least one processor is further configured to replicate a group of neural processing units in the layer of the neural network to form a superset of neural processing units, wherein the superset of neural processing units comprises n instances of the group of neural processing units. The at least one processor is further configured to process the input data using the superset of neural processing units to generate output data for the layer of the neural network, wherein processing the input data comprises performing a dropout function by zeroing out one or more weights of a set of weights for each of the n instances of the superset of neural processing units, and convolving, for each of the n instances of the superset of neural processing units in parallel, the input data with one or more non-zeroed out weights of the set of weights. The at least one processor is further configured to determine an uncertainty of the output data for the layer of the neural network. The apparatus may also include a memory coupled to the at least one processor.

Certain aspects of the present disclosure are directed to an apparatus for deep learning in an artificial neural network comprising a plurality of neural processing units. The apparatus generally includes means for receiving input data at an input to a layer of the neural network; means for replicating a group of neural processing units in the layer of the neural network to form a superset of neural processing units, wherein the superset of neural processing units comprises n instances of the group of neural processing units; means for processing the input data using the superset of neural processing units to generate output data for the layer of the neural network, wherein processing the input data comprises performing a dropout function by zeroing out one or more weights of a set of weights for each of the n instances of the superset of neural processing units, and convolving, for each of the n instances of the superset of neural processing units in parallel, the input data with one or more non-zeroed out weights of the set of weights; and means for determining an uncertainty of the output data for the layer of the neural network.

Certain aspects of the present disclosure are directed to a non-transitory computer-readable medium for deep learning in an artificial neural network comprising a plurality of neural processing units. The non-transitory computer-readable medium generally includes instructions that, when executed by at least one processor, configure the at least one processor to receive input data at an input to a layer of the neural network; to replicate a group of neural processing units in the layer of the neural network to form a superset of neural processing units, wherein the superset of neural processing units comprises n instances of the group of neural processing units; to process the input data using the superset of neural processing units to generate output data for the layer of the neural network, wherein processing the input data comprises performing a dropout function by zeroing out one or more weights of a set of weights for each of then instances of the superset of neural processing units, and convolving, for each of the n instances of the superset of neural processing units in parallel, the input data with one or more non-zeroed out weights of the set of weights; and to determine an uncertainty of the output data for the layer of the neural network.

Other aspects, advantages, and features of the present disclosure will become apparent after review of the entire application, including the following sections: Brief Description of the Drawings, Detailed Description, and the Claims.

DETAILED DESCRIPTION

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 1:
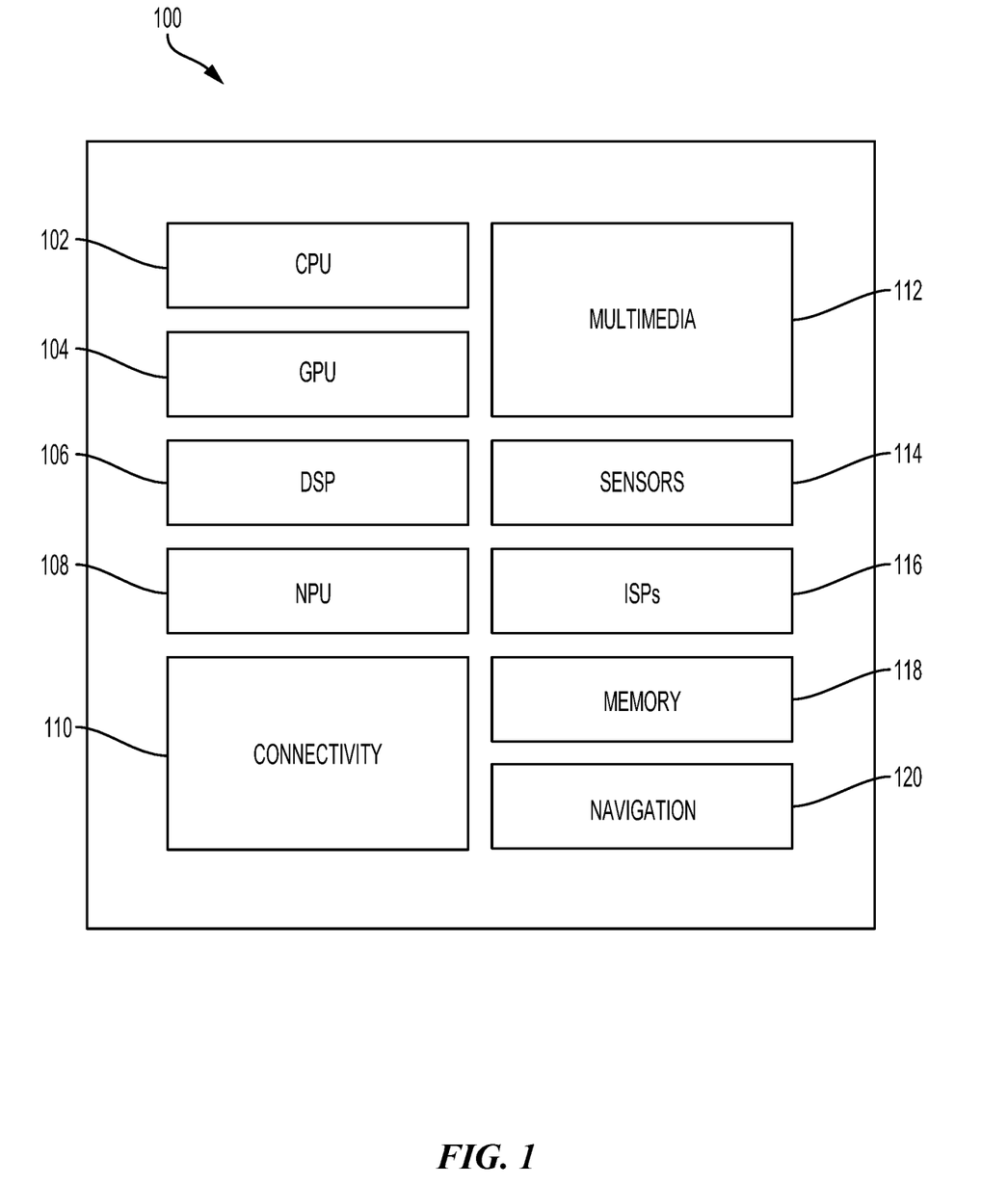
FIG. 1 illustrates an example implementation of a system-on-a-chip (SOC).

FIG. 1 illustrates an example implementation of a system-on-a-chip (SOC) 100, which may include a central processing unit (CPU) 102 or a multi-core CPU configured to perform a parallel Monte Carlo dropout function, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input feature value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input feature and the filter weight when a lookup table miss of the multiplication product is detected.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
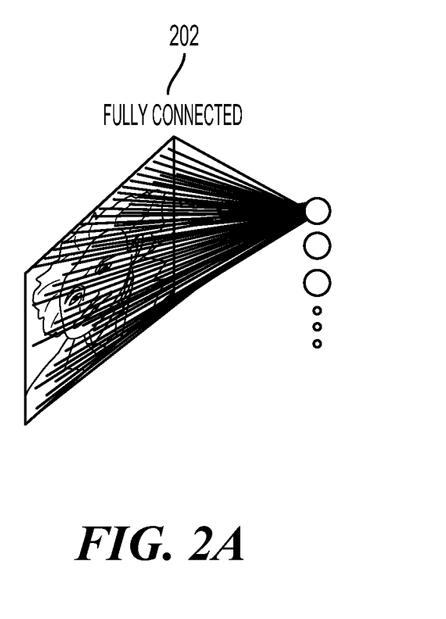
FIG. 2A illustrates an example of a fully connected neural network.
Figure 2B:
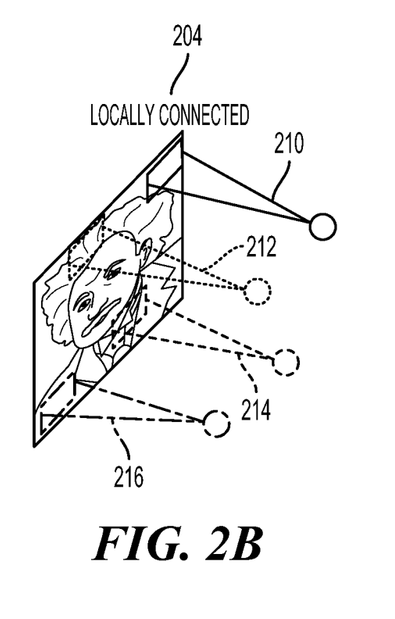
FIG. 2B illustrates an example of a locally connected neural network.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
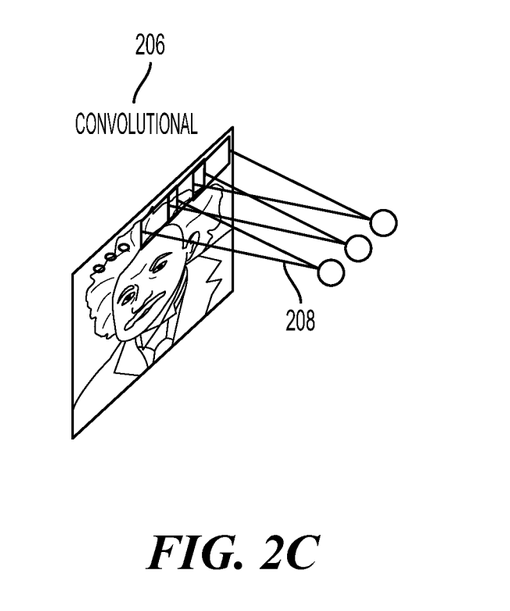
FIG. 2C illustrates an example of a convolutional neural network.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
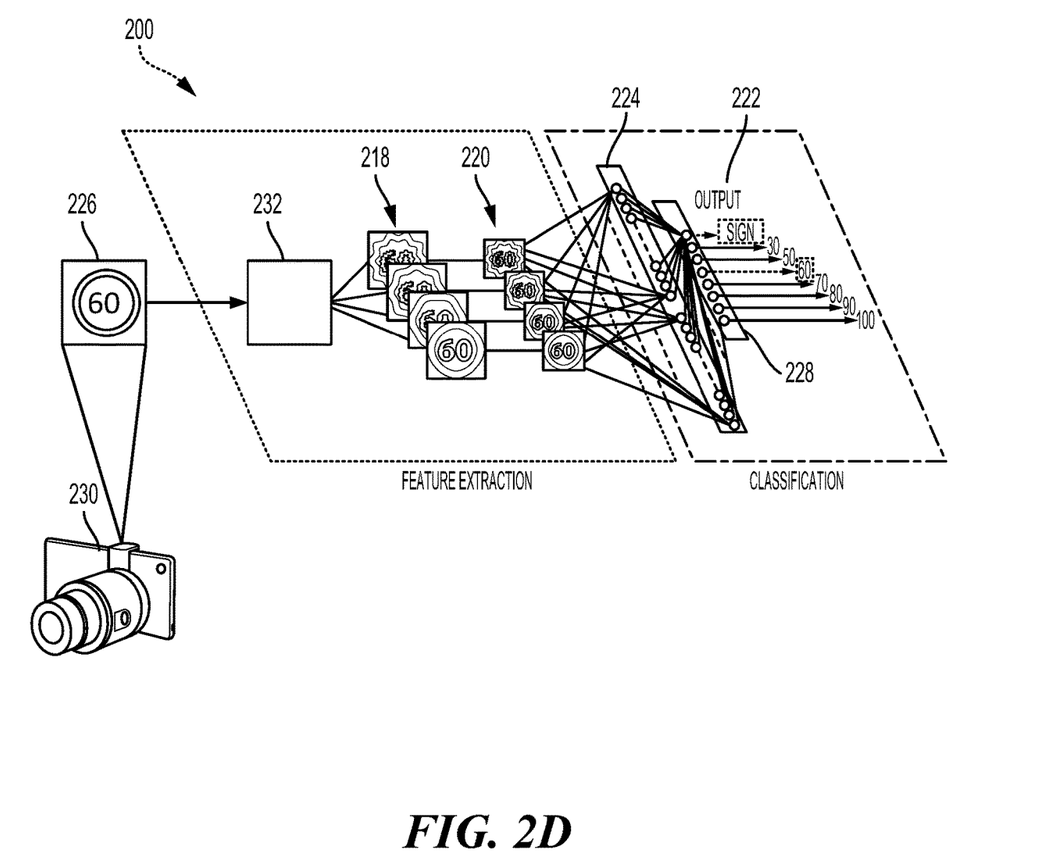
FIG. 2D illustrates a detailed example of a deep convolutional network (DCN) designed to recognize visual features from an image.

One type of convolutional neural network is a deep convolutional neural network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 20) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
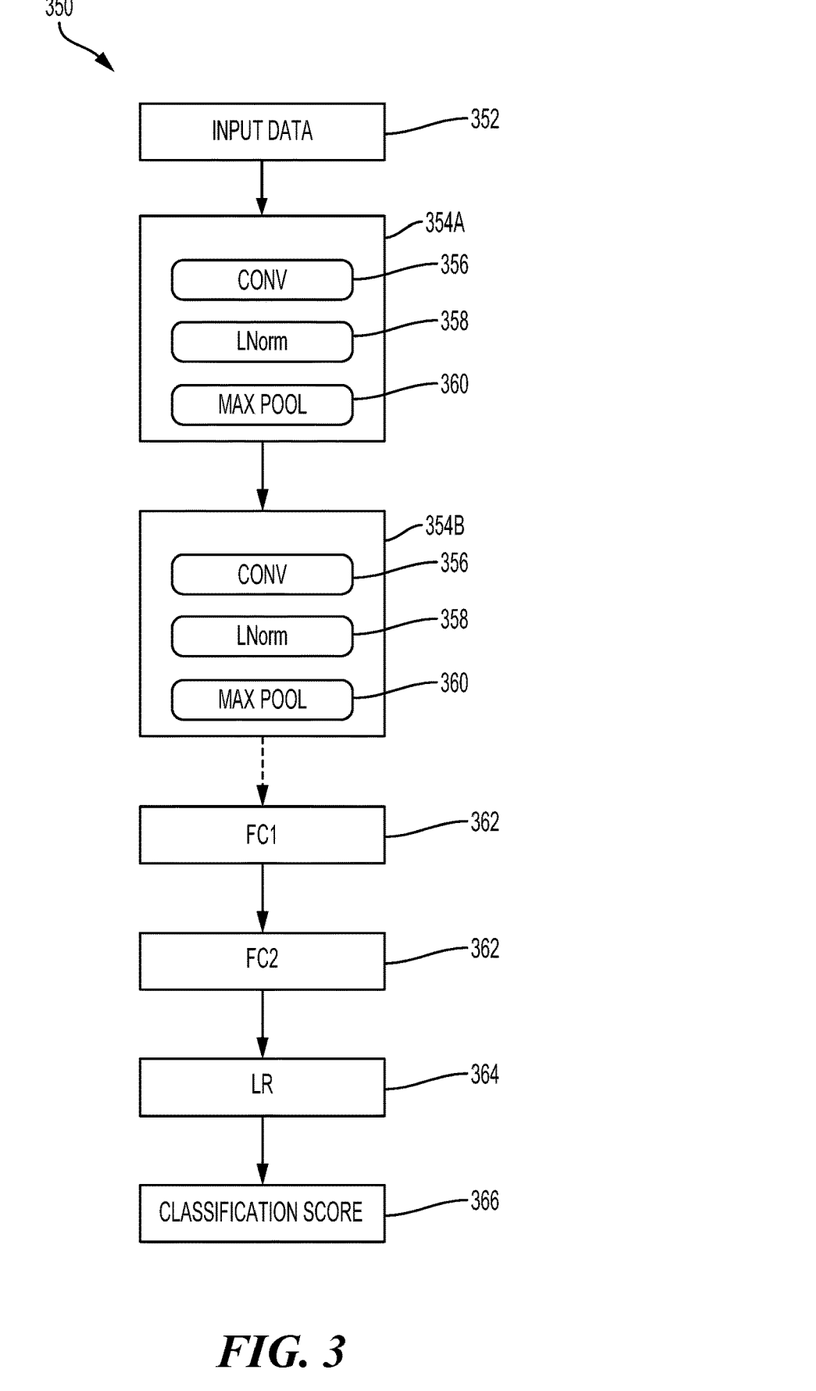
FIG. 3 is a block diagram illustrating a deep convolutional network (DCN).

FIG. 3 is a block diagram illustrating a deep convolutional network 350. The deep convolutional network 350 may include multiple different types of layers based on connectivity and weight sharing. As shown in FIG. 3E, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Example Efficient Dropout Inference for Bayesian Deep Learning

Understanding what a model does not know, known as an "uncertainty," is a significant part in machine learning systems/neural networks. For example, taking into account uncertainties in machine learning algorithms may lead to more accurate predictions by these algorithms. One such algorithm that is able to model uncertainties in neural networks is known as Bayesian deep learning (BDL). Bayesian deep learning is a type of machine learning that is based on statistical inferences in which Bayes' theorem is used to update the probability for a hypothesis as more evidence or information becomes available.

Two main types of uncertainties may be modeled by BDL. A first type of uncertainty is known as "aleatoric uncertainty," which captures noise inherent in observations. In some cases, aleatoric uncertainty may include sensor noise or motion noise, resulting in uncertainty that cannot be reduced by collection of more data. A second type of uncertainty that can be modeled by BDL is known as "epistemic uncertainty," which accounts for uncertainty in the model parameters. Epistemic uncertainty, also known as model uncertainty, may be explained away given enough data. Modeling uncertainties may help interpretation of a model in various computer vision tasks (e.g., segmentation, detection, and the like) and can be used for sensor fusion and path-planning. Additionally, uncertainties may be used for data selection in active learning to largely reduce annotation effort.

Bayesian deep learning offers mathematically grounded tools for modeling uncertainty (e.g., especially epistemic uncertainty/model uncertainty), but these may come with a prohibitive computational cost. For example, modeling epistemic uncertainty involves modeling distributions over models and their parameters, which is much harder to achieve at scale. A popular technique to model these distributions is known as Monte Carlo (MC) dropout sampling, which places a Bernoulli distribution over the neural network's weights.

Monte Carlo dropout proceeds as follows: given a new input x*, compute the neural network output ŷ* with stochastic dropouts at each layer in the neural network; in other words, randomly drop out each hidden unit (e.g., weight) with certain probability p. The stochastic feedforward is repeated B times, and $\{\hat{y}^*_{(1)}, \ldots, \hat{y}^*_{(b)}\}$ is obtained. Then the model uncertainty can be approximated by the sample variance $$\text{Var}(\hat{f}^w(x^*)) \approx 1/B \Sigma_{b=1}^{B} (\hat{y}^*_{(b)} - \overline{y^*})^2, \text{ where}$$
$$\overline{y^*} = 1/B \Sigma \hat{y}^*_{(b)}.$$

Figure 4:
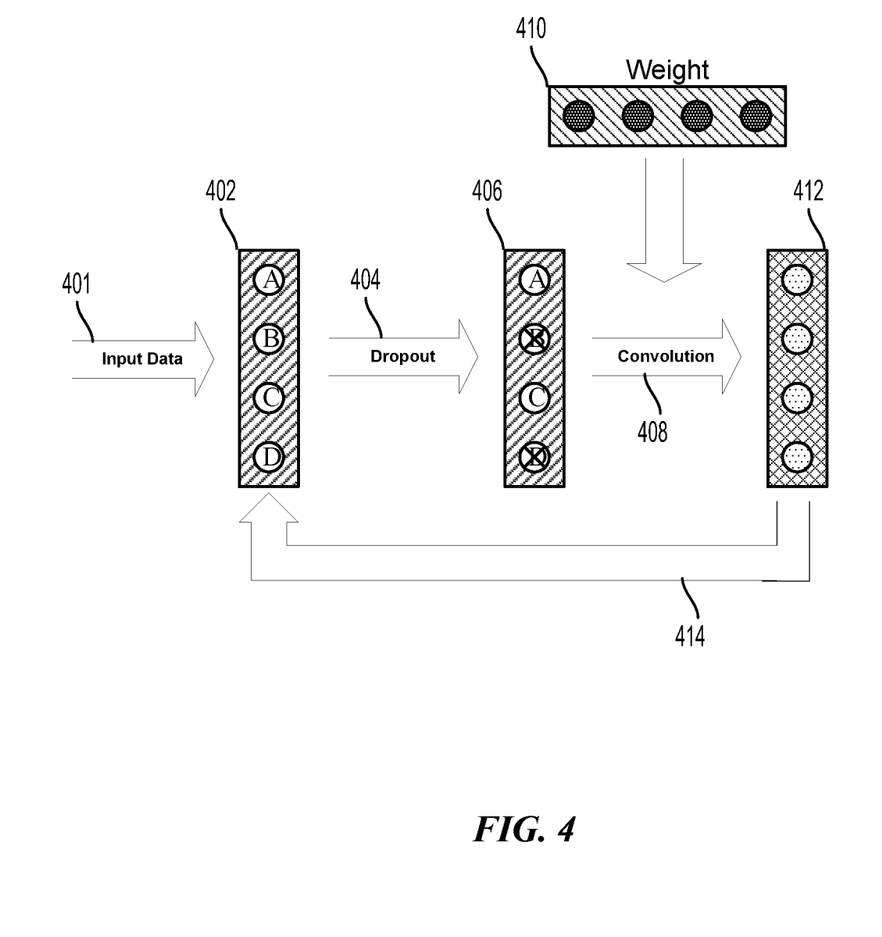
FIG. 4 illustrates an example sequential weight dropout procedure in a convolutional neural network.

FIG. 4 illustrates a first iteration of an example sequential Monte Carlo weight dropout procedure for a single layer of neural processing units in a convolutional neural network. For example, after training of the neural network, input data 401 may be received by a group of neural processing units 402 in a layer of the neural network, which may be associated with a set of weights: A, B, C, and D. It should be noted that layers of a neural network may be associated with any number of weights. At 404, one or more weights in the set of weights may be dropped/zeroed out (e.g., randomly) using the MC dropout algorithm described above. For example, as illustrated at 406, after Monte Carlo dropout is applied to the layer (e.g., using the MC dropout algorithm described above), weights B and D may be zeroed out. Thereafter, at 408, the input data in the layer may be convolved with one or more non-zeroed out weights 410 (namely, weights A and C) to generate output data 412. The output data 412 may then be fed back at 414 into the group of neural processing units 402 of the layer of the neural network and used as the input data for a second forward propagation of the MC dropout procedure during which different combinations of weights are zeroed out. This process continues sequentially a predetermined number of times, and the resulting uncertainty/variance in the output data 412 is determined.

While the Monte Carlo weight dropout procedure illustrated in FIG. 4 may reduce the computational complexity when determining uncertainties in a model, the Monte Carlo weight dropout procedure can be a very time-consuming process since many forward propagations are performed to determine the uncertainty. This is because the general MC dropout procedure cannot fully leverage parallel graphic processing unit (GPU) operations.

Thus, aspects of the present disclosure provide techniques and apparatus for improving this MC dropout procedure, for example by providing an efficient dropout inference for Bayesian deep learning. For example, in some cases, improving the MC dropout procedure may involve replicating a group of neural processing units in a layer of a neural network and performing the MC dropout in parallel with the replicated group of neural processing units, as described in greater detail below with reference to FIG. 5.

Figure 5:
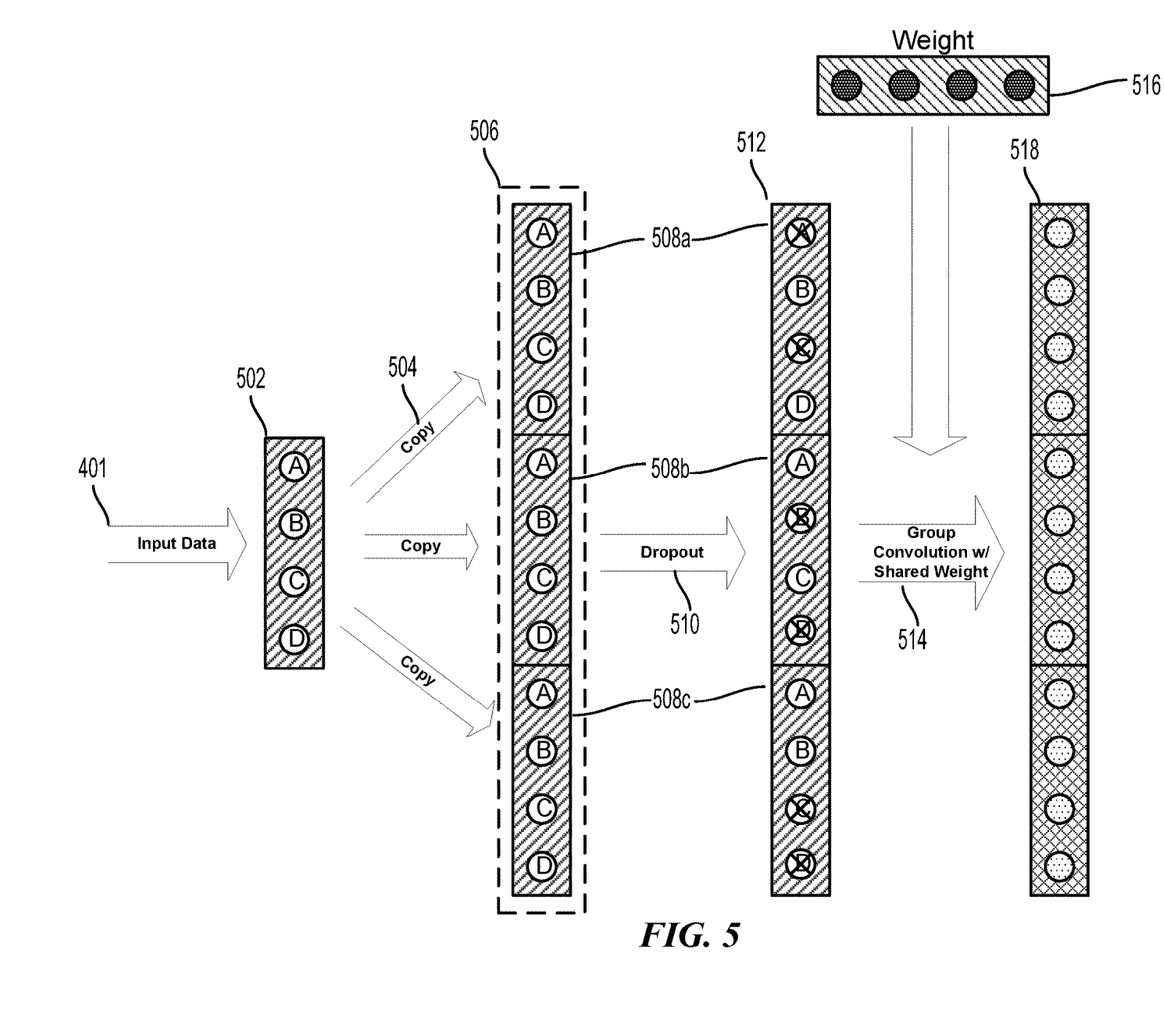
FIG. 5 illustrates an example parallel weight dropout and group convolution procedure in a convolutional neural network, according to aspects presented herein.

FIG. 5 illustrates an example parallel MC weight dropout and group convolution procedure in an artificial neural network, according to aspects presented herein. According to aspects, the MC weight dropout and group convolution procedure illustrated in FIG. 5 may be performed, for example, by a processing system, such as the NPU 108.

According to aspects, as illustrated in FIG. 5, input data 401 may be received at an input to a group of neural processing units 502 in a layer of the neural network. As illustrated, the group of neural processing units 502 may be associated with a set of weights: A, B, C, and D.

At 504, the group of neural processing units 502 in the layer of the neural network may be replicated/copied to form a superset 506 of neural processing units. According to aspects, the superset 506 of neural processing units may comprise n instances of the group of neural processing units. For example, as illustrated, the superset may comprise three instances of the group of neural processing units 502: 508a, 508b, and 508c. According to aspects, while FIG. 5 illustrates the superset 506 as including three instances (e.g., 508a-508c), it should be understood that the superset 506 may include any number of instances. In some cases, the number of instances, n, may be determined based on at least one of a computing budget associated with the neural network or a power budget associated with the neural network.

Each instance 508a, 508b, or 508c of the group of neural processing units 502 may be associated with its own set of weights, based on a shared set of non-zeroed out weights 516. For example, as illustrated, instance 508a is associated with weights A-D, instance 508b is associated with weights A-D, and 508c is associated with weights A-D. According to aspects, each of the n instances 508a-508c of the superset 506 of neural processing units may be independent from each other. In other words, each instance of the n instances of the superset of neural processing units maintains no connections to other instances of the n instances of the superset of neural processing units. That is, for example, the neural processing units of instance 508a may maintain no connections between neural processing units of instance 508b or neural processing units of instance 508c.

According to aspects, the input data may then be processed using the superset 506 of neural processing units to generate output data for the layer of the neural network. For example, at 510, a dropout function (e.g., MC dropout) may be performed by the replicated instances in parallel by zeroing out one or more weights of the set of weights for each of the n instances of the superset 506 of neural processing units. According to aspects, different combinations of weights for each instance of the n instances (e.g., 508a-508c) of the superset 506 of neural processing units may be zeroed out as part of the dropout function. For example, as illustrated at 512, weights A and C for the instance 508a may be zeroed out, while weights B and D for the instance 508b and weights C and D for the instance 508c may be zeroed out. In some cases, zeroing out the different combinations of weights for each instance of the n instances (e.g., 8a-08c) of the superset of neural processing units comprises applying a predefined dropout mask to the superset of neural processing units. For example, according to aspects, the predefined dropout mask may include a predefined pattern of weights to zero out for each instance (e.g., 508a-508c) in the superset 506 of neural processing units. Additionally, in some cases, it may be determined which of the n instances (e.g., 508a-508c) of the superset 506 of neural processing units to zero out the weights, for example, based on at least one of a computing budget associated with the neural network or a power budget associated with the neural network.

According to aspects, the MC dropout function may comprise a structured sparsity-styled dropout function. For example, in some cases, the MC dropout function may employ similar dropout techniques as a structured sparsity function in which weights in filters are split into multiple groups and a more compact neural network is obtained by removing some groups. According to aspects, structured sparsity may be performed on groups of weights in a filter-wise, channel-wise, shape-wise, and/or depth-wise manner. According to aspects, the structured sparsity function may have some pre-defined structured shape for dropout masking which is more efficient in some specific hardware or can leverage parallel computation.

At 514, for each of the n instances (e.g., 508a-508c) of the superset 506 of neural processing units, the input data may be convolved with one or more non-zeroed out weights of the set of weights 516 to generate output data. In this manner, convolution of the input data with multiple different combinations of non-zeroed out weights occurs in parallel using the n instances of neural processing units.

At 518, an uncertainty of the output data for the layer of the neural network may be determined based on the output data from the multiple group convolutions. According to aspects, in some cases, the parallel MC dropout procedure described above may be repeated a threshold number of times by using the output data as the received input data at the input to a group of neural processing units 502 of the layer of the neural network. According to aspects, the threshold number of times may generally be predetermined using some validation sets, with heuristic decision or allowable time in computational budget.

As noted above, the MC dropout procedure described above with respect to FIG. 5 is performed in parallel by the n instances (e.g., 508a-508c) of the superset 506 of neural processing units. Thus, by performing the dropout and convolving in parallel (e.g., instead of in a serial fashion as described in reference to FIG. 4), the MC dropout procedure described herein may reduce the processing time involved to determine a suitable uncertainty.

Figure 6:
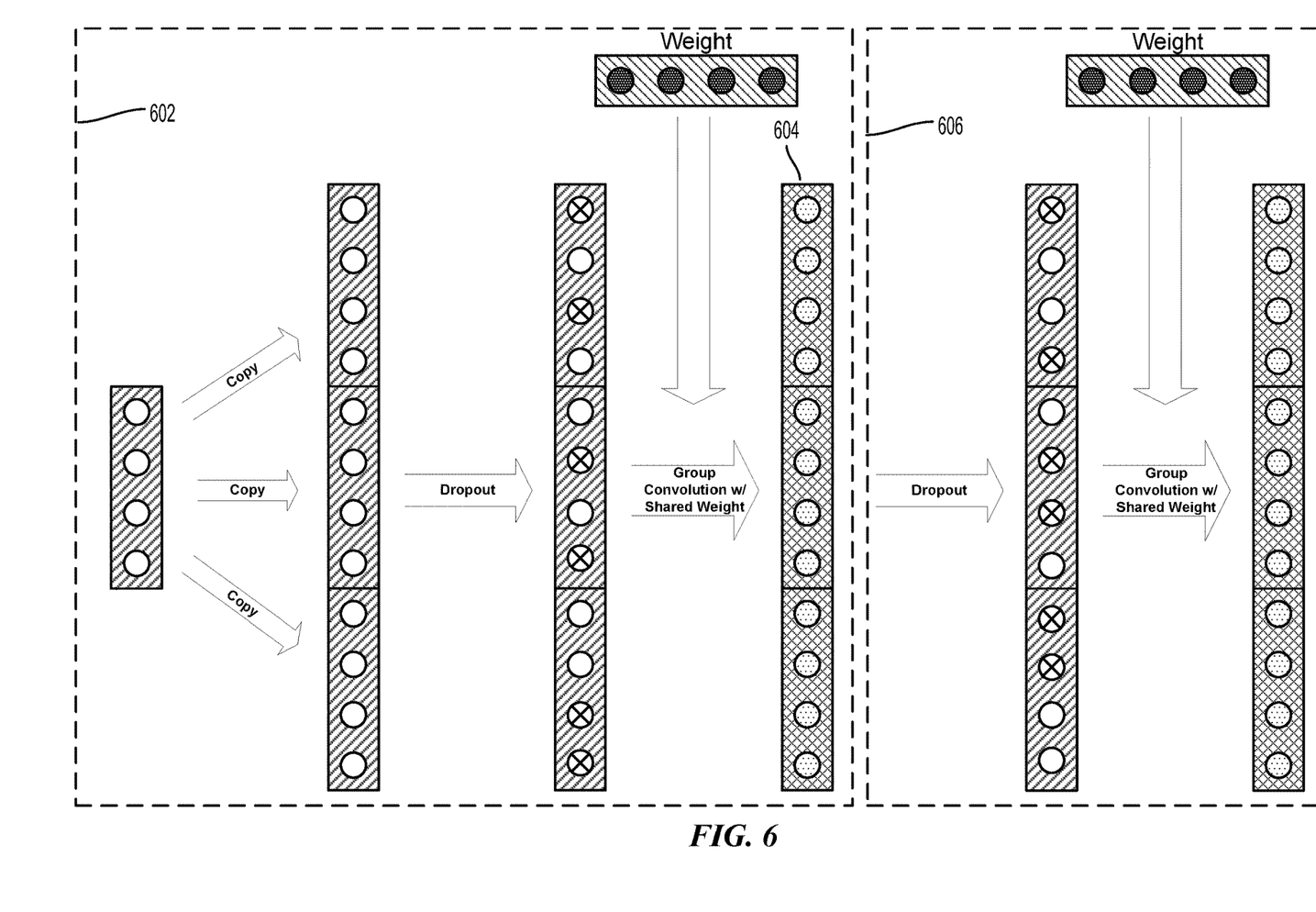
FIG. 6 illustrates a group convolution procedure for stacked dropout layers in a convolutional neural network, according to aspects presented herein.

Additionally, in some cases, the MC dropout procedure described above with respect to FIG. 5 may be used between stacked layers of the neural network. For example, as illustrated in FIG. 6, the output data 604 of a first layer 602 of the neural network may be used as input data of a second layer 606 of the second layer of the neural network. Each layer 602, 606 may include replicated groups of neural processing units, as illustrated, for parallel processing of the dropout procedure at each layer.

Figure 7:
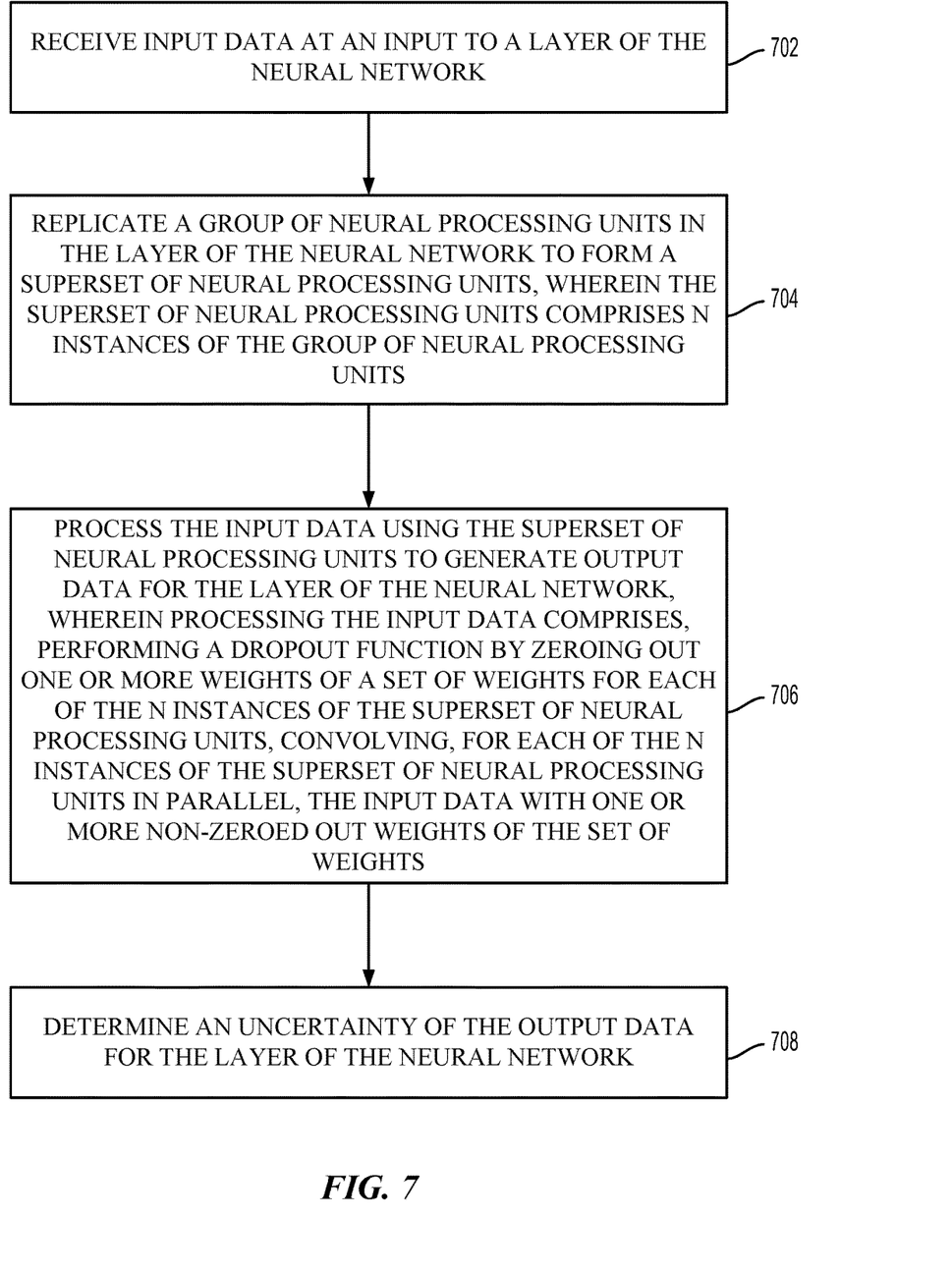
FIG. 7 is a flow diagram of example operations for deep learning in a neural network, according to aspects presented herein.

FIG. 7 is a flow diagram of example operations 700 for deep learning in an artificial neural network, according to aspects presented herein. According to aspects, operations 700 may be performed, for example, by one or more processors, such as the neural processing unit 108.

Operations 700 begin at block 702 with the processor(s) receiving input data at an input to a layer of the neural network.

At block 704, the processor(s) replicate a group of neural processing units in the layer of the neural network to form a superset of neural processing units. The superset of neural processing units comprises n instances of the group of neural processing units.

At block 706, the processor(s) process the input data using the superset of neural processing units to generate output data for the layer of the neural network. According to aspects, processing the input data involves performing a dropout function by zeroing out one or more weights of a set of weights for each of the n instances of the superset of neural processing units. Additionally, processing the input data entails convolving, for each of the n instances of the superset of neural processing units in parallel, the input data with one or more non-zeroed out weights of the set of weights.

At block 708, the processor(s) determine an uncertainty of the output data for the layer of the neural network. For some aspects, the uncertainty may be used in making decisions by the artificial neural network. Additionally, in some cases, based on the determined uncertainty, the processor(s) may infer that a current inference score from the deep neural network (e.g., usually a softmax score or probabilities from a sigmoid function) is confident or not. From this inference, the processor may conclude whether to use the inference score for the next application or to skip/ignore the inference output.

Figure 8:
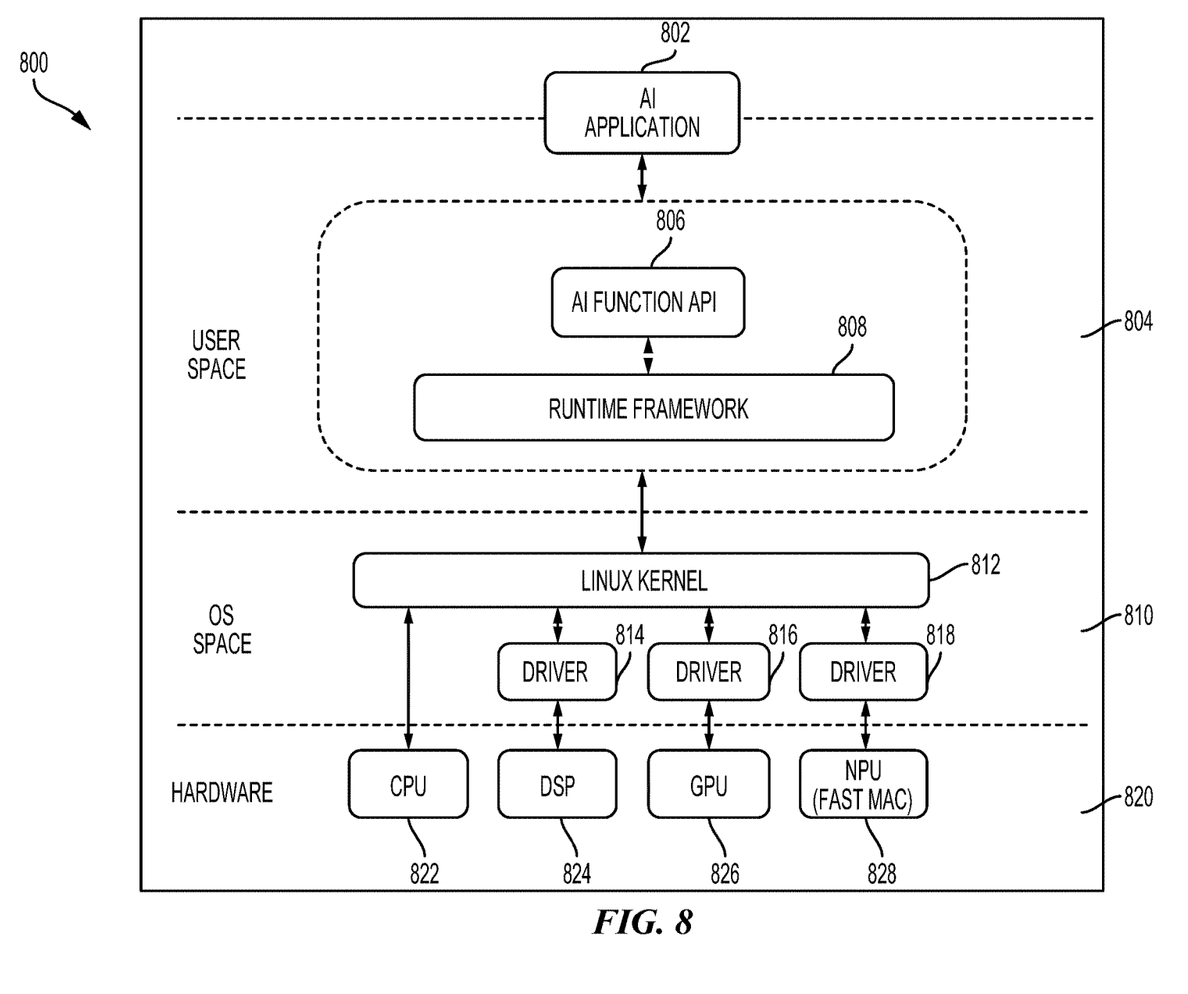
FIG. 8 shows a block diagram illustrating an exemplary software architecture for modularizing artificial intelligence (AI) functions, according to aspects presented herein.

FIG. 8 is a block diagram illustrating an exemplary software architecture 800 that may modularize artificial intelligence (AI) functions. Using the architecture, applications may be designed that may cause various processing blocks of an SOC 820 (for example a CPU 822, a DSP 824, a GPU 826, and/or an NPU 828) to support a parallel MC dropout function/procedure for run-time operation of an AI application 802, according to aspects of the present disclosure.

The AI application 802 may be configured to call functions defined in a user space 804 that may, for example, provide for the detection and recognition of a scene indicative of the location in which the device currently operates. The AI application 802 may, for example, configure a microphone and a camera differently depending on whether the recognized scene is an office, a lecture hall, a restaurant, or an outdoor setting such as a lake. The AI application 802 may make a request to compiled program code associated with a library defined in an AI function application programming interface (API) 806. This request may ultimately rely on the output of a deep neural network configured to provide an inference response based on video and positioning data, for example.

A run-time engine 808, which may be compiled code of a runtime framework, may be further accessible to the AI application 802. The AI application 802 may cause the run-time engine, for example, to request an inference at a particular time interval or triggered by an event detected by the user interface of the application. When caused to provide an inference response, the run-time engine may in turn send a signal to an operating system in an operating system (OS) space 810, such as a Linux Kernel 812, running on the SOC 820. The operating system, in turn, may cause an MC dropout function to be performed on the CPU 822, the DSP 824, the GPU 826, the NPU 828, or some combination thereof. The CPU 822 may be accessed directly by the operating system, and other processing blocks may be accessed through a driver, such as a driver 814, 816, or 818 for, respectively, the DSP 824, the GPU 826, or the NPU 828. In the exemplary example, the deep neural network may be configured to run on a combination of processing blocks, such as the CPU 822, the DSP 824, and the GPU 826, or may be run on the NPU 828.

The various illustrative circuits described in connection with aspects described herein may be implemented in or with an integrated circuit (IC), such as a processor, a digital signal processor (DSP), an application-specific integrated circuit (ASIC), a field-programmable gate array (FPGA), or other programmable logic device. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

The invention claimed is:

1. A method for deep learning in an artificial neural network comprising a plurality of neural processing units, comprising:
receiving input data at an input to a layer of the neural network;
replicating a group of neural processing units in the layer of the neural network to form a superset of neural processing units, wherein the superset of neural processing units comprises n instances of the group of neural processing units;
processing the input data using the superset of neural processing units to generate output data for the layer of the neural network, wherein processing the input data comprises:
performing a dropout function by zeroing out one or more weights of a set of weights for each of the n instances of the superset of neural processing units; and
convolving, for each of the n instances of the superset of neural processing units in parallel, the input data with one or more non-zeroed out weights of the set of weights; and
determining an uncertainty of the output data for the layer of the neural network.

2. The method of claim 1, wherein the n instances of the superset of neural processing units are independent from each other.

3. The method of claim 2, wherein each instance of the n instances of the superset of neural processing units maintains no connections to other instances of the n instances of the superset of neural processing units.

4. The method of claim 1, further comprising repeating the method a predetermined number of times using the output data as the received input data at the input to the layer of the neural network.

5. The method of claim 1, wherein zeroing out the one or more weights comprises zeroing out different combinations of weights for each instance of the n instances of the superset of neural processing units.

6. The method of claim 5, wherein zeroing out the different combinations of weights for each instance of the n instances of the superset of neural processing units comprises applying a predefined dropout mask to the superset of neural processing units.

7. The method of claim 6, wherein the predefined dropout mask includes a predefined pattern of weights to zero out for each instance in the superset of neural processing units.

8. The method of claim 1, further comprising determining n based on at least one of a computing budget associated with the neural network or a power budget associated with the neural network.

9. The method of claim 1, further comprising determining in which of the n instances of the superset of neural processing units to zero out the weights based on at least one of a computing budget associated with the neural network or a power budget associated with the neural network.

10. The method of claim 1, wherein:
the dropout function comprises a structured sparsity-styled dropout; and
performing the dropout function by zeroing out the one or more weights of the set of weights comprises zeroing out one or more groups of weights in the set of weights in at least one of a filter-wise, channel-wise, shape-wise, or depth-wise manner.

11. The method of claim 1, wherein performing the dropout function comprises performing a Monte Carlo dropout.

12. The method of claim 1, wherein determining the uncertainty comprises determining a variance of the output data for the layer of the neural network.

13. An apparatus for deep learning in an artificial neural network comprising a plurality of neural processing units, comprising:
at least one processor configured to:
receive input data at an input to a layer of the neural network;
replicate a group of neural processing units in the layer of the neural network to form a superset of neural processing units, wherein the superset of neural processing units comprises n instances of the group of neural processing units; and
process the input data using the superset of neural processing units to generate output data for the layer of the neural network, wherein processing the input data comprises:
performing a dropout function by zeroing out one or more weights of a set of weights for each of the n instances of the superset of neural processing units; and
convolving, for each of the n instances of the superset of neural processing units in parallel, the input data with one or more non-zeroed out weights of the set of weights; and determine an uncertainty of the output data for the layer of the neural network; and a memory coupled to the at least one processor.

14. The apparatus of claim 13, wherein then instances of the superset of neural processing units are independent from each other.

15. The apparatus of claim 14, wherein each instance of then instances of the superset of neural processing units maintains no connections to other instances of the n instances of the superset of neural processing units.

16. The apparatus of claim 13, wherein the at least one processor is further configured to repeat the replicating, the processing, and the determining a predetermined number of times using the output data as the received input data at the input to the layer of the neural network.

17. The apparatus of claim 13, wherein the at least one processor is configured to zero out the one or more weights by zeroing out different combinations of weights for each instance of the n instances of the superset of neural processing units.

18. The apparatus of claim 13, wherein the at least one processor is further configured to determine n based on at least one of a computing budget associated with the neural network or a power budget associated with the neural network.

19. The apparatus of claim 13, wherein the at least one processor is configured to determine the uncertainty by determining a variance of the output data for the layer of the neural network.

20. A non-transitory computer-readable medium for deep learning in an artificial neural network comprising a plurality of neural processing units, the medium comprising instructions that, when executed by at least one processor, configure the at least one processor to:

receive input data at an input to a layer of the neural network;

replicate a group of neural processing units in the layer of the neural network to form a superset of neural processing units, wherein the superset of neural processing units comprises n instances of the group of neural processing units;

process the input data using the superset of neural processing units to generate output data for the layer of the neural network, wherein processing the input data comprises:

performing a dropout function by zeroing out one or more weights of a set of weights for each of the n instances of the superset of neural processing units; and convolving, for each of the n instances of the superset of neural processing units in parallel, the input data with one or more non-zeroed out weights of the set of weights; and determine an uncertainty of the output data for the layer of the neural network.

21. The method of claim 1, wherein each instance of the group of neural processing units is associated with a same set of weights.

* * * * *